US011624687B2

(12) United States Patent
Kim

(10) Patent No.: US 11,624,687 B2
(45) Date of Patent: Apr. 11, 2023

(54) APPARATUS AND METHOD FOR DETECTING MICROCRACK USING ORTHOGONALITY ANALYSIS OF MODE SHAPE VECTOR AND PRINCIPAL PLANE IN RESONANCE POINT

(71) Applicant: PUKYONG NATIONAL UNIVERSITY INDUSTRY-UNIVERSITY COOPERATION FOUNDATION, Busan (KR)

(72) Inventor: Chan-Jung Kim, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 35 days.

(21) Appl. No.: 17/374,141

(22) Filed: Jul. 13, 2021

(65) Prior Publication Data

US 2022/0397500 A1 Dec. 15, 2022

(30) Foreign Application Priority Data

Jun. 14, 2021 (KR) ........................ 10-2021-0076918

(51) Int. Cl.
*G01N 3/06* (2006.01)
*G01N 3/34* (2006.01)

(52) U.S. Cl.
CPC .............. *G01N 3/066* (2013.01); *G01N 3/34* (2013.01); *G01N 2203/0039* (2013.01);
(Continued)

(58) Field of Classification Search
CPC .. G01N 3/066; G01N 3/34; G01N 2203/0039; G01N 2203/0062; G01N 2203/0617; G01N 2203/0688
(Continued)

(56) References Cited

U.S. PATENT DOCUMENTS

2009/0114018 A1* 5/2009 Kono .................... G01N 29/30
73/579
2021/0131930 A1* 5/2021 Kinoshita ............... G01N 3/56

FOREIGN PATENT DOCUMENTS

EP 2940440 A1 * 11/2015 ............... B61K 9/04
KR 10-1716877 B1 3/2017
(Continued)

OTHER PUBLICATIONS

Lee et al., "Microcrack Detection Using Spectral Response Data Alone", *Applied Sciences*, 2021, 11, 3655. https://doi.org/10.3390/app11083655.

*Primary Examiner* — Marrit Eyassu
(74) *Attorney, Agent, or Firm* — Knobbe, Martens, Olson & Bear, LLP

(57) ABSTRACT

This application relates to an apparatus and method for detecting a microcrack using orthogonality analysis of a mode shape vector and a principal plane in a resonance point. The apparatus may include a measurement unit comprising multiple sensors and configured to measure whether a crack exists at a measurement target, and an analysis unit configured to determine whether a crack exists, on the basis of measurement values of the respective sensors. The measurement unit includes a fixing jig configured to fix the measurement target, an excitation means configured to apply a predetermined impact to the measurement target, and multiple acceleration sensors attached at predetermined locations on the measurement target. The analysis unit may further calculate frequency responses of the measurement target to the impact applied by the excitation means, and determine whether a crack exists by analyzing the number of resonance points and independence of the resonance points.

11 Claims, 19 Drawing Sheets

(52) U.S. Cl.
CPC ............... *G01N 2203/0062* (2013.01); *G01N 2203/0617* (2013.01); *G01N 2203/0688* (2013.01)

(58) Field of Classification Search
USPC .......................................................... 73/808
See application file for complete search history.

(56) References Cited

FOREIGN PATENT DOCUMENTS

KR        10-1997993 B1     7/2019
KR           101997993 B1 * 10/2019

* cited by examiner

Figure 7

| Specimen | Resonance Frequency (Hz) | Modal Damping (%) | Mode Shape (In-Plane) |
|---|---|---|---|
| No crack | 1145 | 0.38 | Bending (X-Y plane) |
| Crack | 1090 | 0.51 | Bending (X-Y plane) |
|  | 1150 | 1.15 | Bending (X-Z plane) |

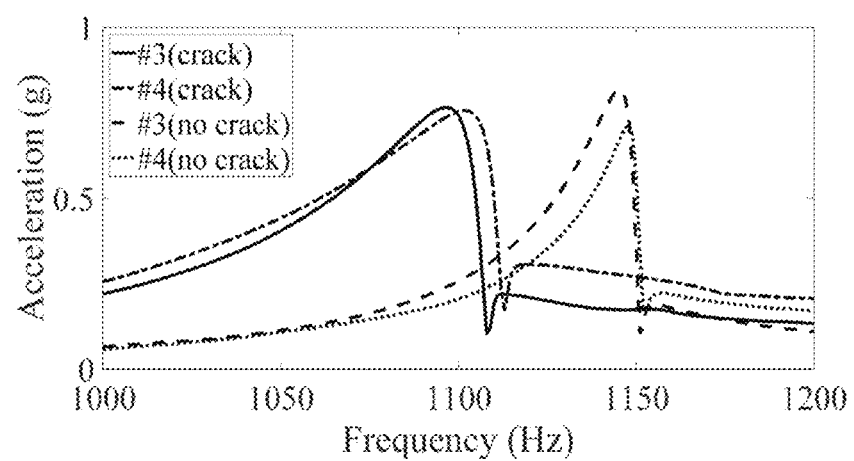

US 11,624,687 B2

APPARATUS AND METHOD FOR DETECTING MICROCRACK USING ORTHOGONALITY ANALYSIS OF MODE SHAPE VECTOR AND PRINCIPAL PLANE IN RESONANCE POINT

CROSS REFERENCE TO RELATED APPLICATION

The present application claims priority to Korean Patent Application No. 10-2021-0076918, filed Jun. 14, 2021, the entire contents of which is incorporated herein for all purposes by this reference.

BACKGROUND

Technical Field

The present disclosure relates to a microcrack detection apparatus and method for detecting whether a defect, for example, a crack, exists at a measurement target.

Description of the Related Technology

In general, in manufacturing vehicle or mechanical components, cracks occur inevitably on a surface of a material or product during a processing process such as plastic deformation, so it is very difficult to achieve manufacturing without defects such as cracks or microcracks.

In particular, deformation resistance is considerably higher during cold forming than that during hot forming, so more microcracks may occur. Therefore, in conducting a quality inspection of a surface of a cold-formed material, the depth of microcracks on a product needs to be decided. The identified microcrack depth and its reliability depend greatly on the resolution of the applied nondestructive testing method.

SUMMARY

The present disclosure relates to an apparatus and a method for detecting a microcrack using orthogonality analysis of a mode shape vector and a principal plane in a resonance point, wherein the apparatus and the method are configured to be capable of always accurately determining whether a crack exists regardless of a measurement location, in order to solve the following problem of inspection apparatuses and methods: an inspection result having relatively high reliability is provided when an occurrence location of a defect, such as a crack, is close to a measurement point, but as a measurement location is far from an occurrence location of a defect, the sensitivity decreases and the accuracy of inspection is not guaranteed.

The present disclosure further relates to an apparatus and a method for detecting a microcrack using orthogonality analysis of a mode shape vector and a principal plane in a resonance point, wherein in order to solve the problem of inspection apparatuses and methods that as a measurement location is far from an occurrence location of a crack, the sensitivity decreases and the accuracy of crack inspection is not guaranteed, considering the fact that when a microcrack exists, one resonance point appears as two sideband resonance points and that by performing comparison for a modal assurance criterion (MAC) value for two separate very close resonance points and by analyzing whether principal planes of two mode shape are orthogonal to each other, whether the modes are different is clearly identified, the apparatus and the method according to the present disclosure are configured to identify whether two resonance points are independent of each other through the MAC value when a resonance point of a frequency response function acquired in microcrack inspection is divided into two sidebands, and to analyze whether principal planes of mode shape information corresponding to the respective resonance points are orthogonal to each other, thereby detecting whether a microcrack exists regardless of a measurement location more accurately compared to the conventional methods.

The present disclosure is directed to providing an apparatus and a method for detecting a microcrack using orthogonality analysis of a mode shape vector and a principal plane in a resonance point, wherein the apparatus and the method are configured to be capable of always accurately determining whether a crack exists regardless of a measurement location, in order to solve the following problem of inspection apparatuses and methods: an inspection result having relatively high reliability is provided when an occurrence location of a defect, such as a crack, is close to a measurement point, but as a measurement location is far from an occurrence location of a defect, the sensitivity decreases and the accuracy of inspection is not guaranteed.

In addition, the present disclosure is directed to providing an apparatus and a method for detecting a microcrack using orthogonality analysis of a mode shape vector and a principal plane in a resonance point, wherein in order to solve the problem of inspection apparatuses and methods that as a measurement location is far from an occurrence location of a crack, the sensitivity decreases and the accuracy of crack inspection is not guaranteed, considering the fact that when a microcrack exists, one resonance point appears as two sideband resonance points and that by performing comparison for a modal assurance criterion (MAC) value for two separate very close resonance points and by analyzing whether principal planes of two mode shape are orthogonal to each other, whether the modes are different is clearly identified, the apparatus and the method according to the present disclosure are configured to identify whether two resonance points are independent of each other through the MAC value when a resonance point of a frequency response function acquired in microcrack inspection is divided into two sidebands, and to analyze whether principal planes of mode shape information corresponding to the respective resonance points are orthogonal to each other so as to determine whether a microcrack exists, thereby detecting a microcrack regardless of a measurement location more accurately compared to the conventional methods.

According to the present disclosure, there is provided an apparatus for detecting a microcrack, the apparatus including: a measurement unit including multiple sensors for measuring whether a crack exists at a measurement target; and an analysis unit performing a process of determining whether a crack exists, on the basis of measurement values of the respective sensors of the measurement unit, wherein the measurement unit includes: a fixing jig for fixing the measurement target; an excitation means for applying a predetermined impact to the measurement target; and multiple acceleration sensors attached at predetermined locations on the measurement target, and wherein the analysis unit is configured to perform a process of calculating frequency responses of the measurement target to the impact applied by the excitation means, on the basis of measurement values of the respective acceleration sensors, and determining whether a crack exists by analyzing the number of resonance points and independence of the resonance points, on the basis of the fact that a resonance point of a frequency response function appears as two sideband resonance points when a crack exists at the measurement target.

Herein, the apparatus may further include: a communication unit for transmitting and receiving various types of data including the measurement values and analysis results by using at least one communication method of wireless communication or wired communication; a display unit including a display means for displaying a current state and operation of the apparatus, and the various types of data including the measurement values and the analysis results; and a control unit performing a process of controlling an overall operation of the apparatus including the measurement unit, the analysis unit, the communication unit, and the display unit.

In addition, the fixing jig may be configured to fix one end of the measurement target.

In addition, the excitation means may be configured to include an impact hammer.

Moreover, the acceleration sensors may be configured such that at least one of the acceleration sensors is attached on each face of the measurement target.

In addition, the analysis unit may be configured to perform a process of: calculating frequency response functions for respective measurement points from acceleration responses received from the respective acceleration sensors after the measurement target is fixed using the fixing jig and the predetermined impact is applied to the measurement target through the excitation means, and identifying the number of the resonance points by acquiring resonance frequencies for the respective frequency response functions; acquiring, when a case of two resonance points is found, a modal assurance criterion (MAC) value for the resonance points, and identifying whether the resonance points are independent of each other, on the basis of a predetermined criterion; analyzing whether principal planes of mode shape vectors of the respective resonance points are orthogonal to each other when it is determined that the resonance points are independent of each other as a result of identification, and identifying whether the resonance points have different modes; and determining that a crack exists at the measurement target when it is identified that the resonance points have the different modes as the result of identification, and determining that the measurement target has a defect.

Herein, the analysis unit may be configured to perform a process in which the modal assurance criterion (MAC) value of 0.8 or greater is considered to indicate the same resonance point, and the modal assurance criterion (MAC) value of less than 0.8 is considered to indicate the different modes.

Moreover, the apparatus may be configured to store each processing process and the analysis results in a particular storage means according to control of the control unit, to perform a process of outputting through the display unit, and to perform a process of transmitting to an external device including a server or a user terminal, through the communication unit.

Herein, the user terminal may be configured as an information communication terminal device on which a dedicated application program is installed, the device including a smartphone, a tablet PC, or a laptop computer, and being carried by an individual.

In addition, according to the present disclosure, there is provided a method for detecting a microcrack using the apparatus for detecting the microcrack, the method including: a measurement step of performing a process of fixing a measurement target by using the fixing jig of the apparatus, applying a predetermined impact to the measurement target through the excitation means of the apparatus, and measuring acceleration responses through the respective acceleration sensors of the apparatus; a resonance point number identification step of performing, through the analysis unit of the apparatus, a process of calculating frequency response functions for respective measurement points from the acceleration responses received from the respective acceleration sensors, and identifying the number of resonance points by acquiring resonance frequencies for the respective frequency response functions; an independence identification step of performing, through the analysis unit of the apparatus, a process of acquiring, when a case of two resonance points is found at the resonance point number identification step, a modal assurance criterion (MAC) value for the resonance points, and identifying whether the resonance points are independent of each other, on the basis of a predetermined criterion; a modal analysis step of performing, through the analysis unit of the apparatus, a process of analyzing whether principal planes of mode shape vectors of the respective resonance points are orthogonal to each other when it is determined that the resonance points are independent of each other, and identifying whether the resonance points have different modes; and a determination step of performing, through the analysis unit of the apparatus, a process of determining that a crack exists at the measurement target when it is identified that the resonance points have the different modes as a result of the analysis at the modal analysis step, and determining that the measurement target has a defect.

Herein, the independence identification step may be configured to perform a process in which the modal assurance criterion (MAC) value of 0.8 or greater is considered to indicate the same resonance point, and the modal assurance criterion (MAC) value of less than 0.8 is considered to indicate the different modes.

Considering the fact that when a microcrack exists, one resonance point appears as two sideband resonance points and that by performing comparison for a modal assurance criterion (MAC) value for two separate very close resonance points and by analyzing whether principal planes of two mode shape are orthogonal to each other, whether the modes are different is clearly identified, the apparatus and the method according to the present disclosure are configured to identify whether two resonance points are independent of each other through the MAC value when a resonance point of a frequency response function acquired in microcrack inspection is divided into two sidebands, and to analyze whether principal planes of mode shape information corresponding to the respective resonance points are orthogonal to each other, thereby determining whether a microcrack exists regardless of a measurement location more accurately compared to the conventional methods.

In addition, according to the present disclosure, provided is the apparatus and the method for detecting a microcrack using orthogonality analysis of a mode shape vector and a principal plane in a resonance point, the apparatus and the method being configured to be capable of always accurately determining whether a crack exists regardless of a measurement location as described above. Therefore, it is possible to solve the following problem of inspection apparatuses and methods: an inspection result having relatively high reliability is provided when an occurrence location of a defect, such as a crack, is close to a measurement point, but as a measurement location is far from an occurrence location of a defect, the sensitivity decreases and the accuracy of inspection is not guaranteed.

BRIEF DESCRIPTION OF THE DRAWINGS

The above and other objectives, features, and other advantages of the present disclosure will be more clearly understood from the following detailed description when taken in conjunction with the accompanying drawings.

FIG. 7 is a table illustrating a result of a modal analysis for two rectangular simple specimens.

FIGS. 8A to 8C are graphs illustrating acceleration responses measured at respective nodes with respect to a specimen with a microcrack and a specimen without a microcrack.

DETAILED DESCRIPTION

Figure 1:
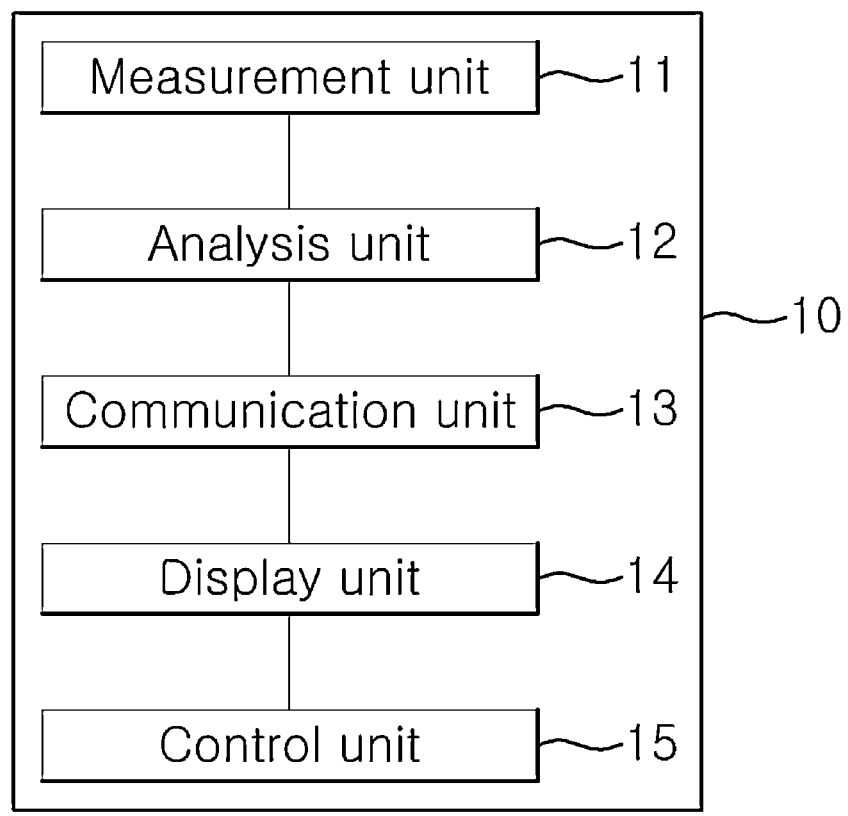
FIG. 1 is a block diagram schematically illustrating an overall configuration of an apparatus for detecting a microcrack using orthogonality analysis of a mode shape vector and a principal plane in a resonance point according to an embodiment of the present disclosure.

For crack detection, various nondestructive testing methods using an acoustic emission sensor or a fiber optic sensor, for example, have been proposed. However, there are only a few methods applicable for detecting microcracks with depths of 100 to 200 μm, and most of the methods require expensive testing equipment.

In addition, as an example of an apparatus and a method for detecting a defect existing at a measurement target, as described above, first, Korean Patent No. 10-1716877 discloses "APPARATUS AND METHOD FOR DETECTING FATIGUE CRACK USING NONLINEAR ULTRASOUND BASED ON SELF-PIEZOELECTRIC SENSING".

More specifically, Korean Patent No. 10-1716877 above relates to an apparatus and a method for detecting a fatigue crack using nonlinear ultrasound based on self-piezoelectric sensing, the apparatus including: an ultrasonic excitation unit exciting ultrasound of a preset excitation frequency to a target structure; an ultrasonic response measurement unit measuring ultrasonic responses generated at the target structure in response to the excited ultrasound; and a damage diagnosis unit calculating a linear coefficient and a non-linear coefficient on the basis of harmonic waves corresponding to the excitation frequency among the measured ultrasonic responses, and detecting whether the target structure is damaged, on the basis of the calculated linear coefficient and non-linear coefficient. The apparatus and the method are configured to minimize an erroneous rate caused by system-specific non-linearity and external environmental changes, through damage diagnosis based on both a linear and a non-linear parameter for a target structure.

In addition, as another example of an apparatus and a method for detecting a defect existing at a measurement target, as described above, Korean Patent No. 10-1997993 discloses "MICROCRACK DETECTION DEVICE AND MICROCRACK DETECTION METHOD USING THE SAME".

More specifically, Korean Patent No. 10-1997993 above relates to a microcrack detection device and a microcrack detection method using the same, the device including: an object supporting part supporting an object placed at a predetermined location; a vibrator applying physical force to one side of an test object by control; a sensor coming into contact with another side of the test object, and collecting a vibration signal generated from the test object by the physical force; and a microcrack detection unit calculating a first frequency response function by converting, into a frequency domain signal, a physical force signal applied by the vibrator and the vibration signal collected by the sensor, and detecting whether a microcrack exists at the test object, by comparing a resonance point extracted from the first frequency response function and a resonance point of a second frequency response function of a pre-measured reference object. The device and the method are configured to effectively determine whether a microcrack, which is very difficult to measure directly, exceeds a standard value, by using a physical phenomenon in which the number of resonance points increases according to the depth of a microcrack.

As described above, various technical contents have been proposed with respect to an apparatus and a method for detecting a defect existing at a measurement target, but such contents have the following problems.

Specifically, in order to detect a defect, such as a crack, the above-described detection apparatuses and methods are configured to detect damage by measuring an ultrasonic response and calculating a linear coefficient and a non-linear coefficient, or to detect whether a microcrack exists through calculation of a frequency response function by converting, into a frequency domain signal, a physical force signal applied by a vibrator and a vibration signal collected by a sensor, and through comparison between a coherence function calculated for a resonance point extracted from the frequency response function and a coherence function for a resonance point of a frequency response function of a pre-measured reference object. Therefore, the configuration for various types of signal processing and calculation in a measurement process is complex, and relatively expensive components are required to perform such complex processing, thus increasing overall inspection cost.

In addition, in general, the above-described detection apparatuses and methods, provide inspection results having relatively high reliability when an occurrence location of a defect is close to a measurement point, but are unable to always guarantee the accuracy of a particular level or higher because the sensitivity decreases as a measurement location is far from an occurrence location of a defect.

Therefore, in order to solve the problems of the above-described detection apparatuses and methods, it is preferable to propose a new crack detection apparatus and method that are configured to be able to always accurately determine whether a crack exists, regardless of a measurement location with a relatively simple construction and low cost, but an apparatus or method satisfying such requirements has not proposed yet.

Hereinafter, a detailed embodiment of an apparatus and a method for detecting a microcrack using orthogonality analysis of a mode shape vector and a principal plane in a resonance point according to the present disclosure will be described with reference to the accompanying drawings.

Here, it should be noted that the following description is merely one exemplary embodiment to carry out the present disclosure, but the present disclosure is not limited to the exemplary embodiments which will be described below.

Further, it should be noted that in the following description of the exemplary embodiment of the present disclosure, when it is determined that a portion is the same as or similar to that of the related art or easily understood and carried out by those skilled in the art, a detailed description thereof will be omitted for simplifying the description.

That is, the present disclosure relates to an apparatus and a method for detecting a microcrack using orthogonality analysis of a mode shape vector and a principal plane in a resonance point, wherein the apparatus and the method are configured to be capable of always accurately determining whether a crack exists regardless of a measurement location, in order to solve the following problem of inspection apparatuses and methods: an inspection result having relatively high reliability is provided when an occurrence location of a defect, such as a crack, is close to a measurement point, but as a measurement location is far from an occurrence location of a defect, the sensitivity decreases and the accuracy of inspection is not guaranteed.

In addition, the present disclosure is directed to providing an apparatus and a method for detecting a microcrack using orthogonality analysis of a mode shape vector and a principal plane in a resonance point, wherein in order to solve the problem of inspection apparatuses and methods that as a measurement location is far from an occurrence location of a crack, the sensitivity decreases and the accuracy of crack inspection is not guaranteed, considering the fact that when a microcrack exists, one resonance point appears as two sideband resonance points and that by performing comparison for a modal assurance criterion (MAC) value for two separate very close resonance points and by analyzing whether principal planes of two mode shape are orthogonal to each other, whether the modes are different is clearly identified, the apparatus and the method according to the present disclosure are configured to identify whether two resonance points are independent of each other through the MAC value when a resonance point of a frequency response function acquired in microcrack inspection is divided into two sidebands, and to analyze whether principal planes of mode shape information corresponding to the respective resonance points are orthogonal to each other so as to determine whether a microcrack exists, thereby detecting a microcrack regardless of a measurement location more accurately compared to the conventional methods.

With reference to the accompanying drawings, an apparatus and a method for detecting a microcrack using orthogonality analysis of a mode shape vector and a principal plane in a resonance point according to the present disclosure will be described in detail.

First, referring to FIG. 1, FIG. 1 is a block diagram schematically illustrating an overall configuration of an apparatus 10 for detecting a microcrack using orthogonality analysis of a mode shape vector and a principal plane in a resonance point according to an embodiment of the present disclosure.

As shown in FIG. 1, according to an embodiment of the present disclosure, the apparatus 10 for detecting a microcrack using orthogonality analysis of a mode shape vector and a principal plane in a resonance point may schematically include: a measurement unit 11 including multiple measurement sensors for measuring whether a crack exists at a measurement target; and an analysis unit 12 performing a process of determining whether a crack exists, on the basis of measurement values of the respective sensors of the measurement unit 11.

In addition, as shown in FIG. 1, the apparatus 10 for detection may further include: a communication unit 13 for transmitting and receiving various types of data including a measurement value and an analysis result and for performing communication with an external device through at least one communication method of wireless communication or wired communication; a display unit 14 including a display means, such as a monitor or a display, for displaying a current state and operation of the apparatus and various types of data including each measurement value and analysis result; and a control unit 15 performing a process of controlling the overall operation of each of the above-described units and of the apparatus 10 for detection.

Figure 2:
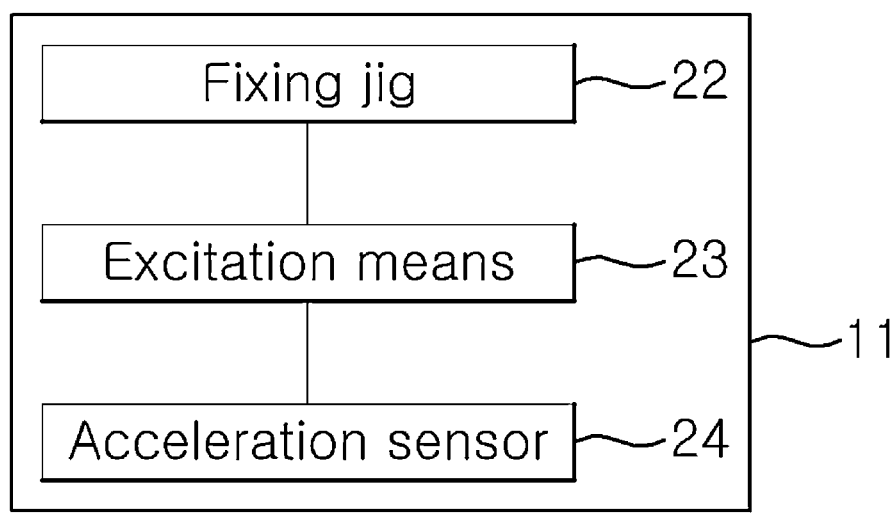
FIG. 2 is a block diagram schematically illustrating a detailed configuration of a measurement unit of the apparatus for detecting a microcrack using orthogonality analysis of a mode shape vector and a principal plane in a resonance point according to the embodiment of the present disclosure shown in FIG. 1.

In addition, referring to FIG. 2, FIG. 2 is a block diagram schematically illustrating a detailed configuration of the measurement unit 11 of the apparatus 10 for detecting a microcrack using orthogonality analysis of a mode shape vector and a principal plane in a resonance point according to the embodiment of the present disclosure shown in FIG. 1.

As shown in FIG. 2, the measurement unit 11 may include: a fixing jig 22 for fixing a measurement target 21; an excitation means 23, for example, an impact hammer, for applying any predetermined impact to the measurement target; and multiple acceleration sensors 24 attached at predetermined respective locations on the measurement target, so as to measure a frequency response of the measurement target to the impact applied by the excitation means 23.

Figure 3:
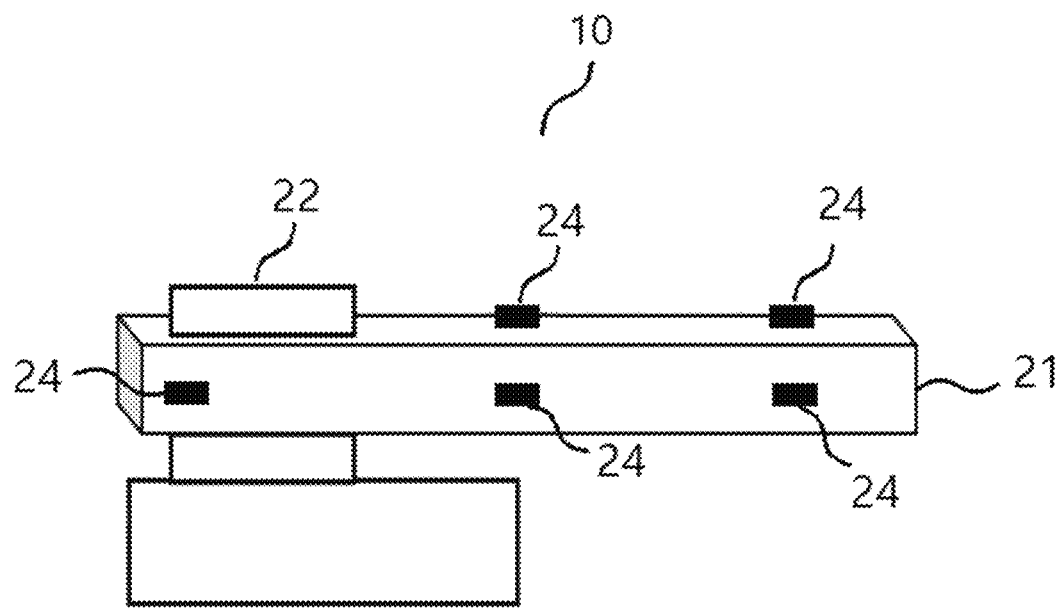
FIG. 3 is a diagram schematically illustrating an overall configuration of an apparatus for detecting a microcrack using orthogonality analysis of a mode shape vector and a principal plane in a resonance point according to an embodiment of the present disclosure.
Figure 4:
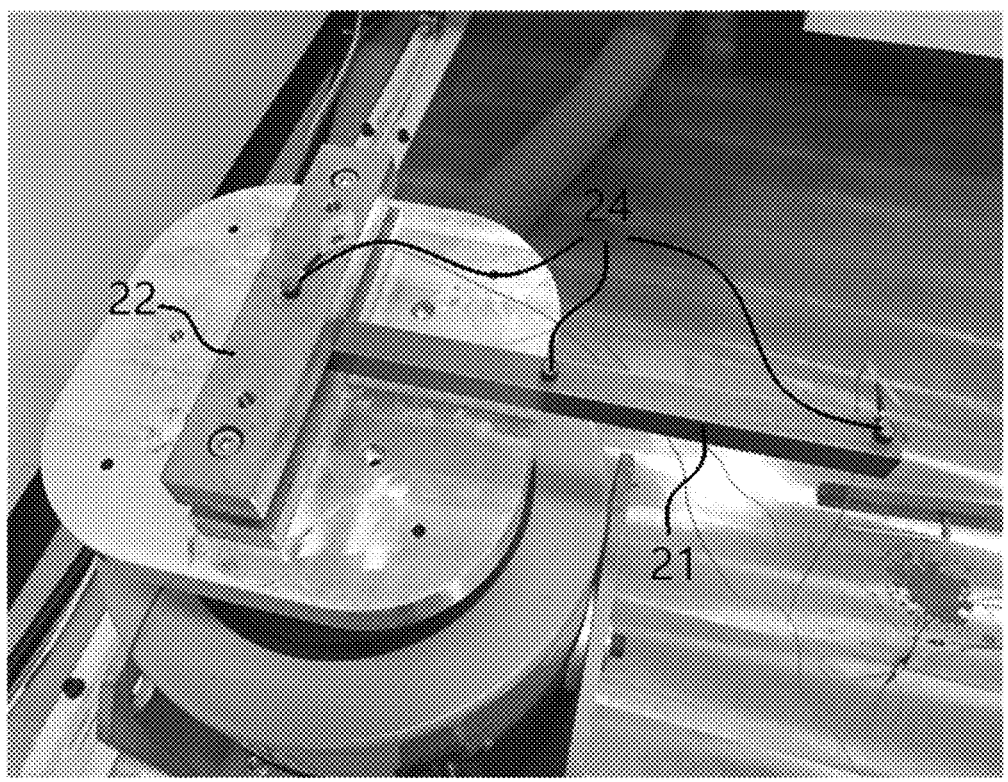
FIG. 4 is a diagram illustrating that the apparatus, which is shown in FIG. 3, for detecting a microcrack is actually realized.

More specifically, referring to FIGS. 3 and 4, FIG. 3 is a diagram schematically illustrating an overall configuration of an apparatus 10 for detecting a microcrack using orthogonality analysis of a mode shape vector and a principal plane in a resonance point according to an embodiment of the present disclosure. FIG. 4 is a diagram schematically illustrating that the apparatus 10, which is shown in FIG. 3, for detecting a microcrack is actually realized.

As shown in FIGS. 3 and 4, according to an embodiment of the present disclosure, the apparatus 10 for detecting a microcrack using orthogonality analysis of a mode shape vector and a principal plane in a resonance point is configured to perform a process of determining whether a crack exists as follows: fix the measurement target 21 by using the fixing jig 22; applies impact to the measurement target 21 through the excitation means 23, for example, an impact hammer (not shown); calculates frequency responses for respective parts through the acceleration sensors 24; and analyzes, through the analysis unit 12, when there are two resonance points of the frequency response for a particular point, mode shapes and whether principal planes are orthogonal for each of the resonance points.

Herein, regarding the acceleration sensors 24, one or more acceleration sensors may be attached at predetermined intervals at predetermined locations on each plane of the measurement target 21, for example. The attached locations or the number of such acceleration sensors 24 may be appropriately decided as needed, for example, depending on the type or size of the measurement target 21.

More specifically, as described above the analysis unit calculates frequency response functions for respective measurement points from the acceleration responses received from the respective acceleration sensors 24, and identifies the number of resonance points by acquiring the resonance frequencies of the calculated frequency response functions.

As a result of identification, when two resonance points are found at a particular point, the modal assurance criterion (MAC) value for the resonance points is acquired to identify whether the resonance points have the same mode.

Herein, the MAC value may be identified according to a predetermined criterion. In general, the MAC value of 0.8 or greater is considered to indicate the same resonance point. Therefore, for example, the MAC value of less than 0.8 may be considered to indicate different modes. However, the determination criterion as described above may be appropriately set as needed.

As a result of comparison between the MAC values, when the resonance points have different modes, mode shapes of the respective resonance points are analyzed and whether principal planes of mode shape vectors are orthogonal to each other is determined.

As a result of determination, when the principal planes are orthogonal, it is determined that a crack exists at the measurement target and the measurement target has a defect. When there is one resonance point in the above-described processing process, when the resonance points have the same mode, or when the principal planes of the mode shape vectors for the respective resonance points are not orthogonal to each other, it is determined that a crack does not exist at the measurement target and that the measurement target is normal, and the process ends.

In addition, the apparatus 10 for detecting a microcrack may store the processing process and result as described above in a particular storage means according to the control of the control unit 15, and may perform a process of outputting through the display unit 14 and a process of transmitting to an external device, for example, a server of a user terminal, through the communication unit 13.

That is, according to an embodiment of the present disclosure, on the basis of the fact that when a microcrack exists at the measurement target, the resonance point of the frequency response function appears as two sideband resonance points, the apparatus 10 for detecting a microcrack identifies whether two resonance points are independent of each other through comparison for the modal assurance criterion (MAC) value for the two resonance points, and analyzes whether the principal planes of two mode shapes are orthogonal to each other so that whether the modes are different is identified. Accordingly, the apparatus 10 is able to detect whether a microcrack exists more accurately than the conventional method in which the accuracy is lower as the distance between a measurement location and a crack is farther.

Herein, more specific details of the process of acquiring a resonance frequency and a resonance point from an acceleration response and acquiring a modal assurance criterion (MAC) value as described above, and the modal analysis process for determining whether principal planes of mode shapes are orthogonal to each other can be appropriately configured by those skilled in the art with reference to the contents of the related art. Therefore, it should be noted that to simplify the description in the present disclosure, a detailed description of the contents which can be easily understood and implemented by those skilled in the art with reference to the documents in the related art is omitted.

Therefore, from the above-described configuration, according to an embodiment of the present disclosure, the apparatus 10 for detecting a microcrack using orthogonality analysis of a mode shape vector and a principal plane in a resonance point is realized with a simple configuration and low cost, compared to the conventional measurement apparatuses and methods for determining whether a crack exists by comparing a coherence function for a frequency response measured by applying impact and a coherence function for a frequency response pre-measured for the case of no crack. In addition, it is possible to solve the following problem of the conventional measurement apparatuses and methods: because whether a crack exists is determined on the basis of a coherence function, the accuracy and reliability of detection decrease as the distance between a measurement point and a crack is far.

Furthermore, according to an embodiment of the present disclosure, the apparatus 10 for detecting a microcrack using orthogonality analysis of a mode shape vector and a principal plane in a resonance point outputs, through the display unit 14, various types of information including the current operation state, and measurement values and analysis results acquired from each processing process, and transmits the various types of information to an external device, such as a server or a user terminal, through the communication unit 13. Therefore, the apparatus is not just for inspecting a measurement target for cracks, but is able to easily perform the tasks, such as remotely controlling an inspection process or building a data base by collecting data of various measurement targets, thereby providing customized and desired information according to the user's request.

Herein, as the user terminal, an information communication terminal device carried by an individual, for example, a smartphone, a tablet PC, or a laptop computer, is provided with a dedicated application installed thereon. A relatively simple configuration with low cost and ease may be achieved without building particular hardware.

In addition, according to an embodiment of the present disclosure, the apparatus 10 for detecting a microcrack using orthogonality analysis of a mode shape vector and a principal plane in a resonance point may perform training for the database built as described above by using an artificial intelligence learning algorithm, for example, deep learning or machine learning, and may automatically perform a process of determining the state of a measurement target on the basis of a result of training. It should be noted that the present disclosure can be variously modified and changed as needed by those skilled in the art without departing from the gist and scope of the present disclosure.

A process of determining whether a crack exists, by using the apparatus 10, which is configured as described above, for detecting a microcrack using orthogonality analysis of a mode shape vector and a principal plane in a resonance point according to an embodiment of the present disclosure will be described in detail.

Figure 5A:
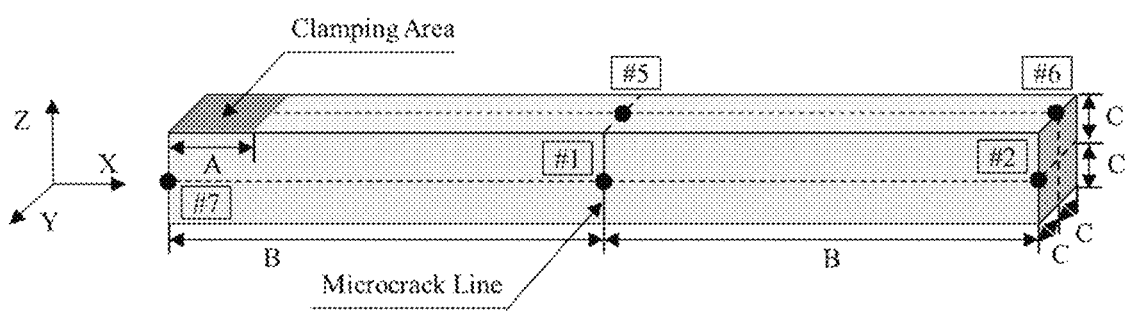
FIGS. 5A and 5B are diagrams illustrating attachment locations of measurement sensors attached at a measurement target, in an apparatus for detecting a microcrack using orthogonality analysis of a mode shape vector and a principal plane in a resonance point according to an embodiment of the present disclosure.
Figure 5B:
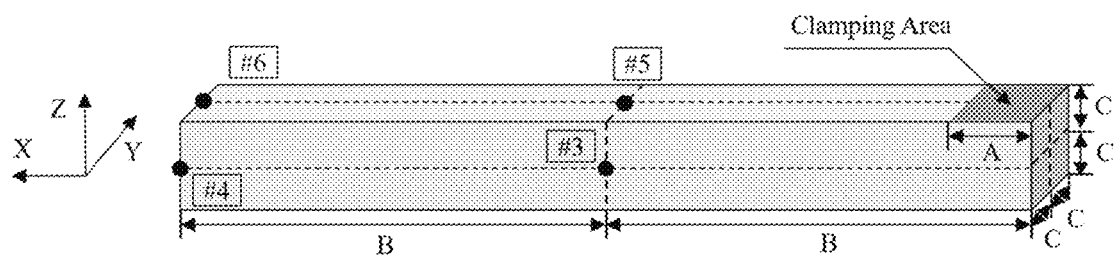

First, referring to FIGS. 5A and 5B, FIGS. 5A and 5B are diagrams illustrating attachment locations of measurement sensors attached at a measurement target, in an apparatus 10 for detecting a microcrack using orthogonality analysis of a mode shape vector and a principal plane in a resonance point according to an embodiment of the present disclosure.

Herein, FIG. 5A shows a measurement target viewed from the front, and FIG. 5B shows the measurement target viewed from the rear. In the embodiment shown in FIGS. 5A and 5B, A is 40 mm, B is 150 mm, and C is 9.5 mm.

As shown in FIGS. 5A and 5B, in the embodiment, a total of six acceleration sensors #1 to #6 are attached, wherein two acceleration sensors are respectively attached at the center and the end of the front, the rear, and the top face of a measurement target. In order to determine the response characteristics at the jig-attached location, an acceleration sensor #7 may be further attached at the side of the fixing jig.

Herein, in the embodiment of the present disclosure, the present disclosure has been described by taking as an example a case in which two acceleration sensors are attached at the front, the rear, and the top face of the measurement target each, that is, a total of six acceleration sensors are attached, but the present disclosure is not necessarily limited to this case. That is, in addition to the case described in the embodiment the present disclosure, it should be noted that the present disclosure is configured in various forms as needed. For example, the number of sensors to be attached may be appropriated increased or decreased depending on the type or size of a measurement target.

That is, in order to verify the performance of the apparatus 10 for detecting a microcrack using orthogonality analysis of a mode shape vector and a principal plane in a resonance point according to the embodiment of the present disclosure configured as described above with reference to FIGS. 1 to 4, the inventors of the present disclosure conducted an impact experiment, with acceleration sensors attached at respective portions of a simple rectangular specimen having one end (40 mm) fixed by a rigid body jig, as shown in FIGS. 5A and 5B.

More specifically, in the embodiment, two specimens were prepared for the impulse test and the material of the responsible specimens was SS400 (POSCO, Pohang, South Korea), and differed in that there was a microcrack at the center of one face of one specimen.

In addition, the response data for these specimens were measured using unidirectional accelerometers #1 to #6 (Model: 3225F2, Dytran, Chatsworth, Calif., USA) attached at each specimen, and data for the rigid body jig was measured using another accelerometer #7.

That is, as shown in FIGS. 5A and 5B, three acceleration sensors #1, #2, and #7 were attached at the front planes (X-Y plane), two acceleration sensors #3 and #4 were attached at the rear planes (X-Y plane), and the other two acceleration sensors #5 and #6 were attached at the orthogonal planes (X-Z plane).

Figure 6A:
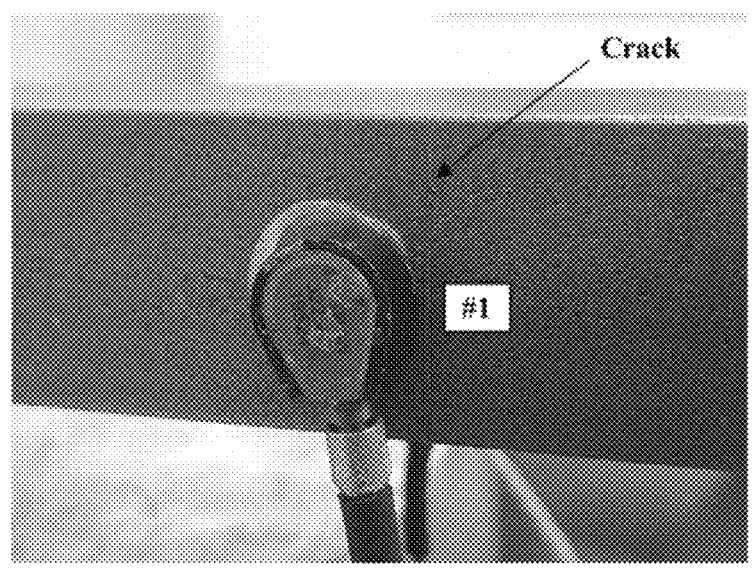
FIGS. 6A and 6B are diagrams illustrating that acceleration sensors were respectively attached at a part in which a crack existed and at a part in which a crack did not exist.
Figure 6B:
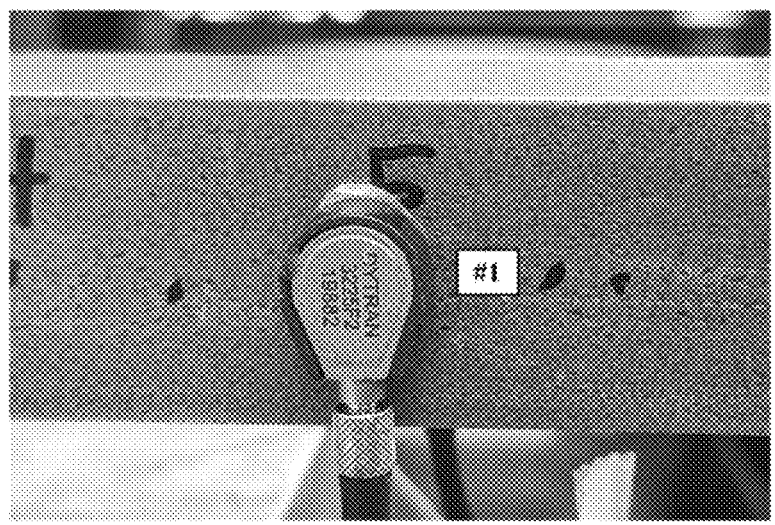

In addition, referring to FIGS. 6A, 6B, and 7, FIGS. 6A and 6B are diagrams illustrating that acceleration sensors were respectively attached at a part in which a crack existed and at a part in which a crack did not exist, wherein FIG. 6A shows a case in which a crack existed and FIG. 6B shows a case in which a crack did not exist.

As shown in FIG. 6A, the microcrack was located at node #1, so the response at node #1 was the nearest to the cracked location and the response at node #2 was far from the cracked location on the same face.

Conversely, as shown in FIG. 6B, the other specimen had no crack at node #1. Node #3 and node #4 were at a similar distance from the cracked location in a manner corresponding to node #1 and node #2, respectively, except that the face of the measured specimen was opposite to the cracked specimen.

Herein, since each specimen had a square cross section and the clamping area (40 mm×19 mm) was perpendicular to the two measured faces of the specimen, the boundary condition for the two faces were assumed to be similar except the existence of the crack.

In addition, before approaching the microcrack detection, the inventors of the present disclosure preliminarily conducted an experimental modal analysis for two rectangular simple specimens with and without a microcrack.

The impact hammer (model: 5800B3, Dytran, Chatsworth, Calif., USA) was used to apply impact force at node #1, and response acceleration data were measured at seven locations from node #1 to node #7, respectively.

In addition, the frequency response functions (FRFs) were acquired using TEST.LAB (Siemens, Munich, Germany), and modal parameters, such as the resonance frequency and the modal damping coefficient, were identified using Poly-Max algorithm in TEST.LAB software.

Herein, the maximum frequency was set to 3200 Hz, and 1024 spectral lines were used during identification of modal parameters.

As a result, first, in the case of the specimen having no crack, the first bending mode was found at 1145 Hz (with the damping coefficient of 0.38%) and the X-Y plane was the in-plane mode.

However, in the case of the specimen having a crack, the first bending mode was identified at 1090 Hz (with the damping coefficient of 0.51%, and in-plane for the X-Z plane), and the second bending mode was identified at 1150 Hz (with the damping coefficient of 1.15%, and in-plane for the X-Y plane).

In addition, the modal assurance criterion (MAC) value between two bending modes showed 0.57 owing to orthogonality between the X-Z plane and the X-Y plane.

Herein, the third peak of the cracked specimen was found at 1185 Hz, but that mode was not considered because the MAC value between the second bending mode and the third bending mode showed 92.3, so that two peaks seemed to be very similar to each other.

In addition, the resonance frequency of the rectangular simple specimen was decreased from 1145 Hz to 1090 Hz, and sideband frequencies were also initiated in the presence of a microcrack at the simple specimen.

That is, referring to FIG. 7, FIG. 7 is a table illustrating a result of a modal analysis for two rectangular simple specimens as described above.

More specifically, as shown in FIG. 7, in the cracked specimen, the first bending mode was found at 1090 Hz (with the modal damping coefficient of 0.39%), and effective only on the X-Y plane.

Moreover, the inventors of the present disclosure conducted another impact hammer test by applying impact force at node #5 to determine the behavior at the X-Z plane more visibly, with respect to the case of the cracked specimen.

However, the modal test result was similar to the impact hammer test at node #1.

Accordingly, both the X-Y plane and the X-Z plane may be denoted as the in-plane and the out-of-plane for the first bending mode.

Figure 8A:
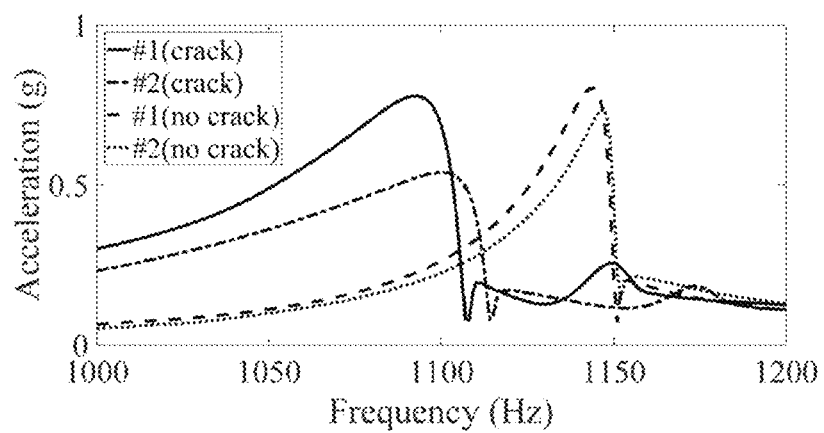
Figure 8C:
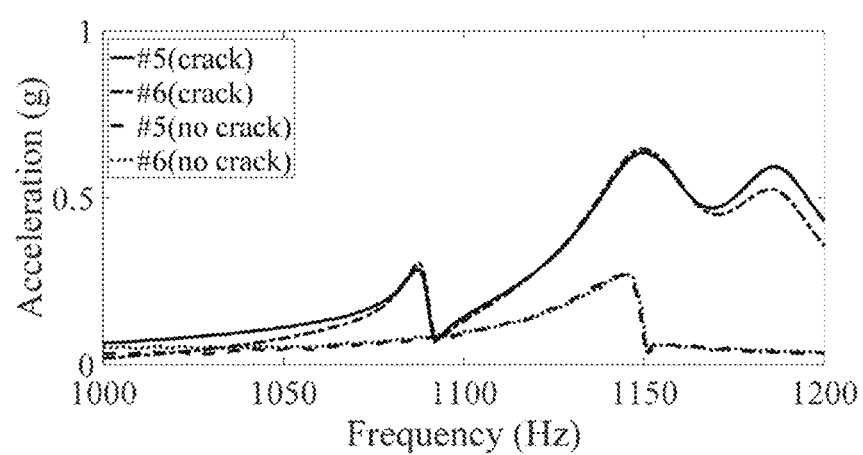

In addition, referring to FIGS. 8A to 8C, FIGS. 8A to 8C are graphs illustrating acceleration responses measured at respective nodes with respect to a specimen with a microcrack and a specimen without a microcrack.

FIGS. 8A to 8C show response accelerations at node #i for input of impulse force at node #i with respect to a specimen with a microcrack and a specimen without a microcrack. FIG. 8A shows acceleration responses at the X-Y plane (front face), FIG. 8B shows acceleration responses at the X-Y plane (rear face), and FIG. 8C shows acceleration responses at the X-Z plane.

As shown in FIGS. 8A to 8C, sideband frequencies between 1000 Hz and 1200 Hz derived from the crack location were seen at node #1 and node #3 near the crack, and these frequencies seemed very sensitive to the distance from the crack.

In the case of the uncracked specimen, single frequency peaks were found at node #1 to node #4 at the X-Y plane, and small peaks were found at node #5 and node #6 at the X-Z plane near the frequency of 1145 Hz.

In the case of the cracked specimen, frequency peaks were found near 1090 Hz at node #1 to node #4 at the X-Y plane, and two small sideband frequencies were found at node #1 and node #2 (front face of the X-Y plane).

On the other hand, the sideband frequencies were highlighted at node #5 and node #6 at the X-Z plane, but the bending mode near 1090 Hz was relatively small. Those responses were well matched with the experimental modal test results in the table of FIG. 7.

Referring to FIGS. 9A to 11B, FIGS. 9A to 11B are diagrams illustrating comparison between (a) a case in which the frequency response function (FRF) was applied as a crack indicator and (b) a case in which the acceleration response was applied as a crack indicator, with respect to the front face (X-Y), the rear face (X-Y), and the X-Z plane of the measurement target.

Figure 9A:
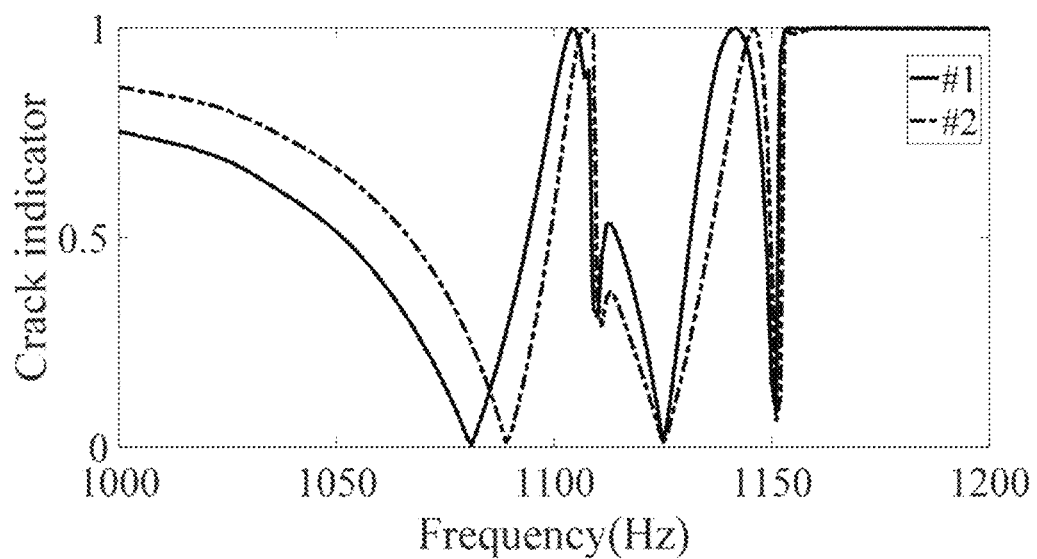
FIGS. 9A and 9B are graphs illustrating comparison between a case in which the frequency response function (FRF) is applied as a crack indicator and a case in which the acceleration response is applied as a crack indicator, with respect to the front face (X-Y plane) of a measurement target.
Figure 10A:
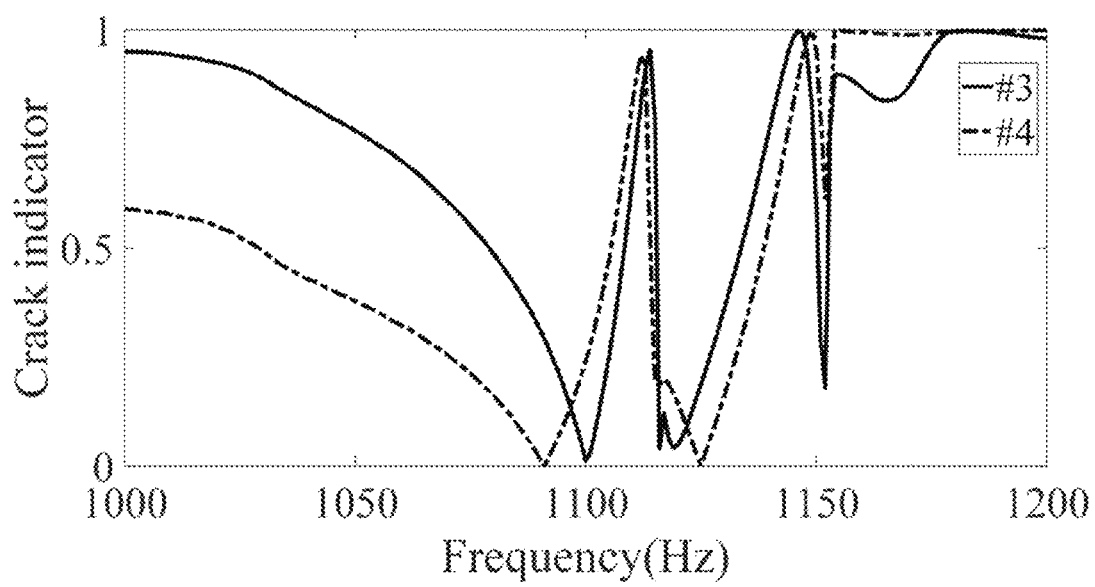
FIGS. 10A and 10B are graphs illustrating comparison between a case in which the frequency response function (FRF) is applied as a crack indicator and a case in which the acceleration response is applied as a crack indicator, with respect to the rear face (X-Y plane) of a measurement target.
Figure 11A:
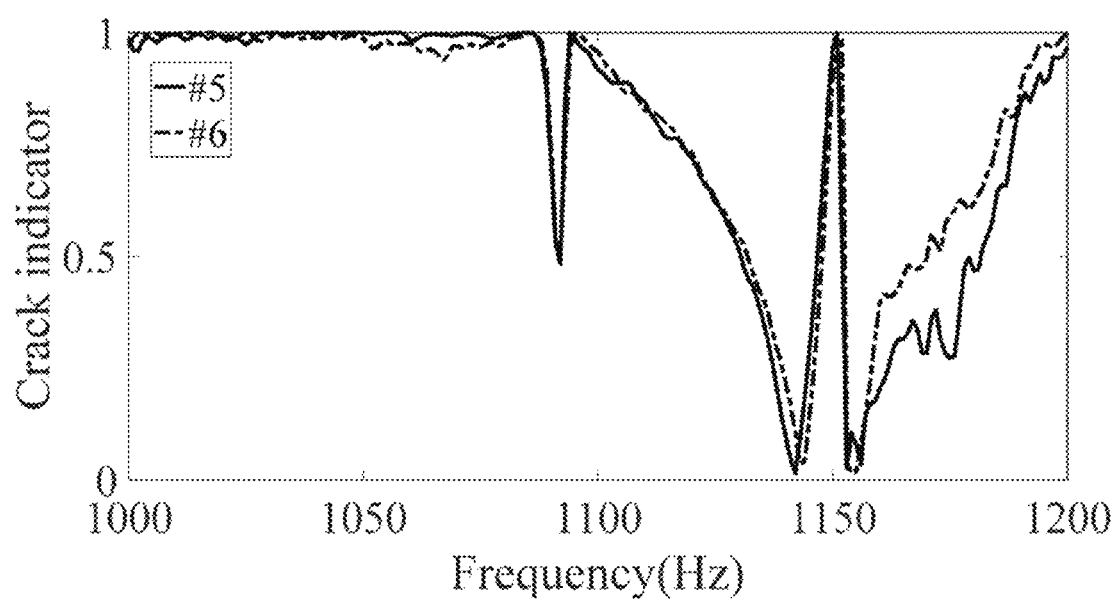
FIGS. 11A and 11B are graphs illustrating comparison between a case in which the frequency response function (FRF) is applied as a crack indicator and a case in which the acceleration response is applied as a crack indicator, with respect to the X-Z plane of a measurement target.

More specifically, as shown in FIGS. 9A, 10A, and 11A each, the coherence functions were calculated using the FRFs in two specimens. All six coherence functions were sensitive to two frequencies: resonance frequency of ~1090 Hz, and sideband frequency of 1150 Hz. These results were proved in studies of the related art.

In addition, the crack indicator at the sideband frequency decreased rapidly regardless of the measurement location, and the coherence values near the resonance frequency varied according to the measurement location. The indicating frequency at the minimum coherence values was lower at node #1 and node #2 (the front face at the X-Y plane) than at node #3 and node #4 (the rear face at the X-Y plane) near 1090 Hz.

In addition, in the case of the X-Z plane, the sensitivity near the resonance frequency at 1090 Hz was not remarkable and additional sensitive frequency was found at 1145 Hz because the X-Z plane was the out-of-plane of the bending mode shape at 1090 Hz. Therefore, the suitable frequency for microcrack detection is the sideband frequency rather than the resonance frequency as in the FRF case.

Figure 9B:
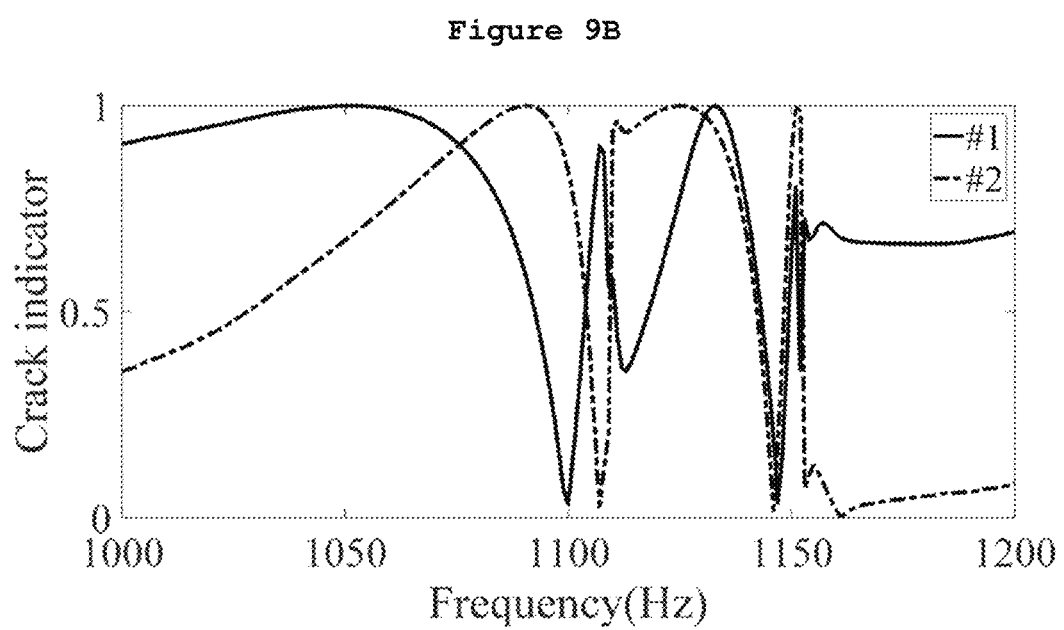
Figure 10B:
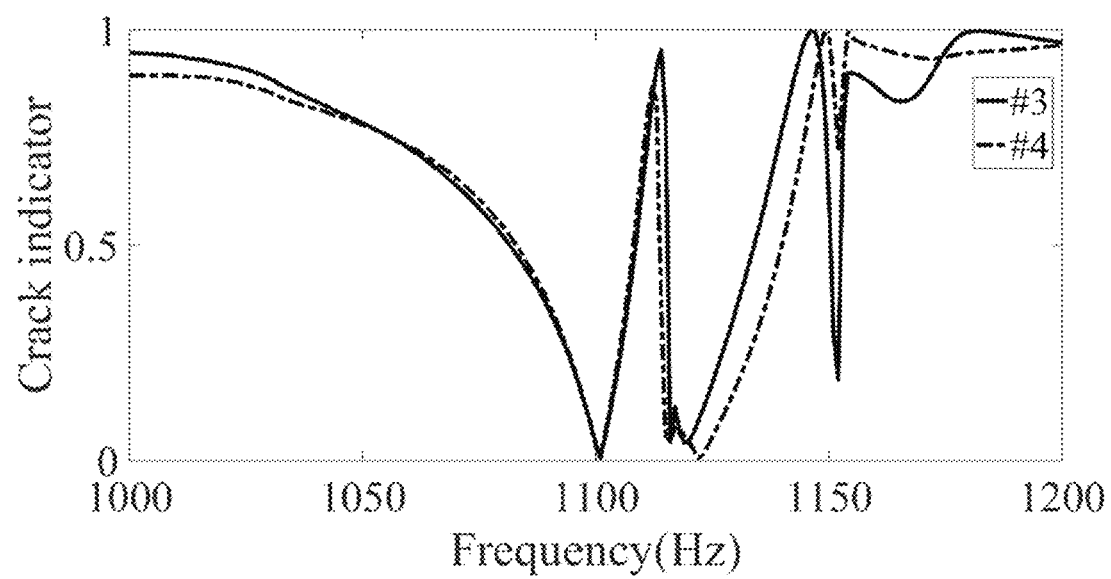
Figure 11B:
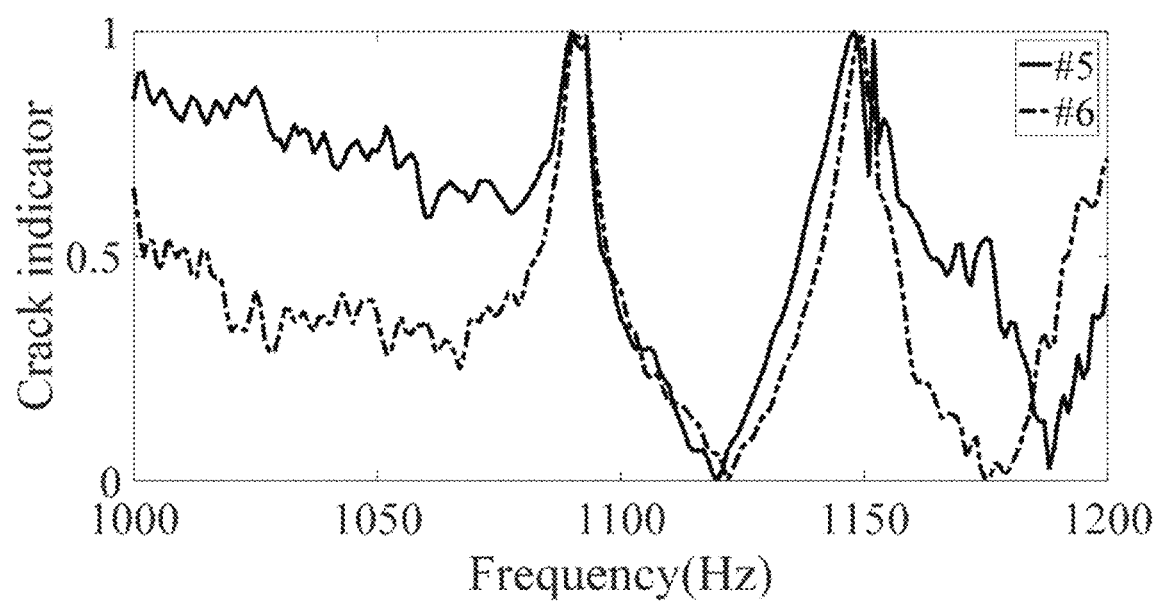

Referring to FIGS. 9B, 10B, and 11B, FIGS. 9B, 10B, and 11B show results of using the same coherence function and only response data for crack detection. For the X-Y plane (front face), node #1 and node #2 were very sensitive to the sideband frequency, but the sensitivity to the resonance frequency differed with the measurement location.

In addition, for the X-Y plane (rear face), node #3 and node #4 showed similar sensitivity to the resonance frequency. Conversely, node #3 (near the crack) showed high sensitivity to the sideband frequency, but node #4 did not.

In addition, the coherence function in the X-Z plane was not similar to that in the X-Y plane. That is, the most sensitive frequency was at ~1121 Hz and the least sensitive frequencies were 1090 Hz and 1145 Hz. Such difference was caused by the orthogonality between two resonance frequencies in the cracked specimen.

Therefore, the sensitivity in microcrack detection was dependent on the measurement location, and the mode shape of target structure will be critical factor to select the suitable sensor location.

That is, in crack inspection, since it is difficult to decide an exact location of a crack in advance, it is preferable to propose an inspection apparatus or method that is able to achieve an accurate inspection regardless of the location of a crack. As described above, the coherence value near the resonance frequency changes depending on a measurement location, but the crack indicator based on the sideband frequency decreases rapidly regardless of the measurement location. From such a result, it is possible to realize an inspection apparatus and method capable of accurately determining whether a crack exists regardless of a measurement location, by using response data for a sideband frequency.

In addition, as described above, the crack indicator using only response data has advantages over the conventional FRF-based method because the calculation process is simple and information on input impulse force is not required.

Therefore, it is possible to realize the apparatus 10 for detecting a microcrack using orthogonality analysis of a mode shape vector and a principal plane in a resonance point according to an embodiment of the present disclosure as described above. Accordingly, it is possible to provide a method for detecting a microcrack, the method having higher accuracy and reliability with a relatively simple configuration and low cost compared to the conventional apparatuses and methods.

Figure 12:
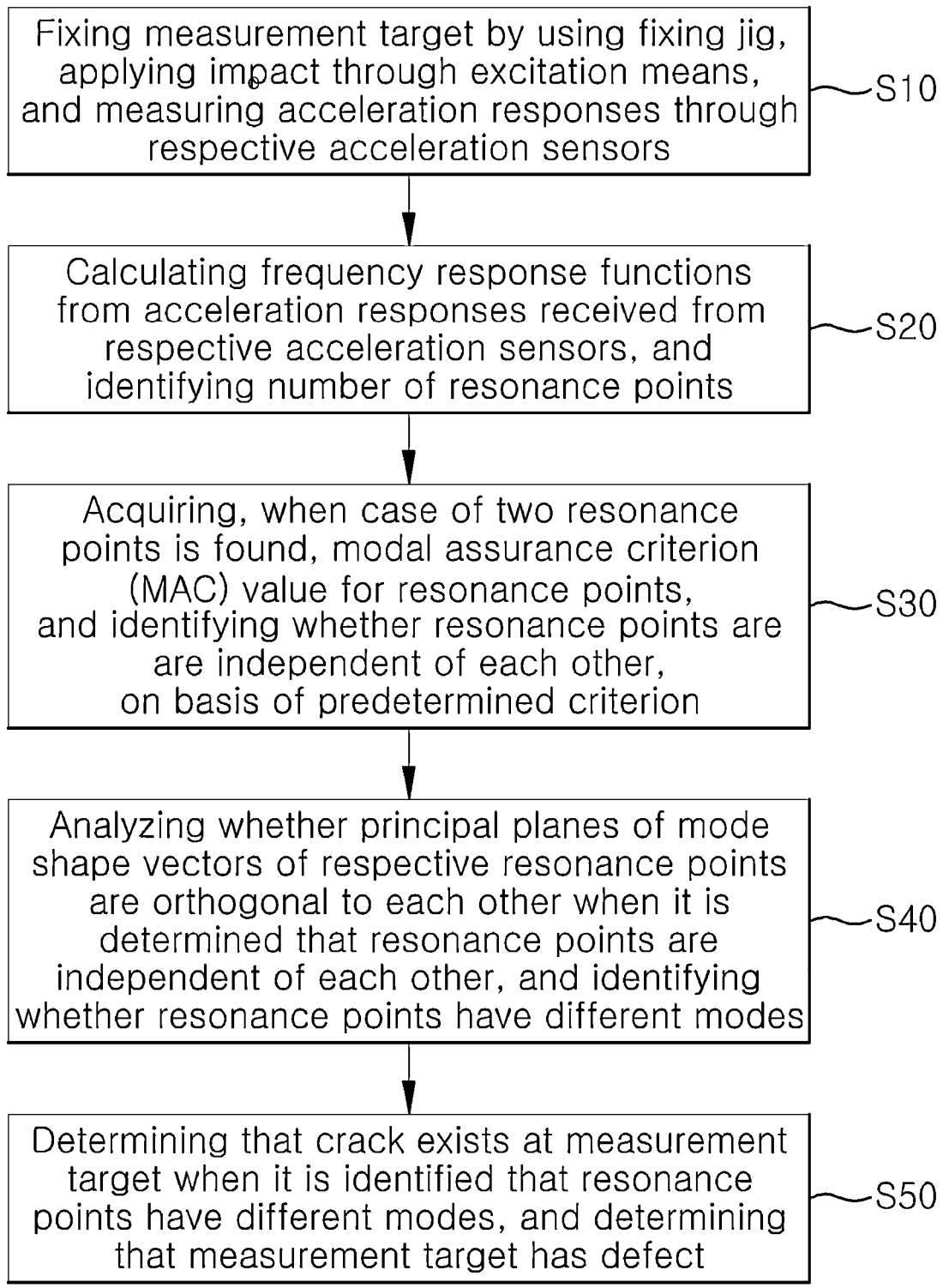
FIG. 12 is a flowchart schematically illustrating an overall configuration of a method for detecting a microcrack using an apparatus for detecting a microcrack according to an embodiment of the present disclosure.

That is, referring to FIG. 12, FIG. 12 is a flowchart schematically illustrating an overall configuration of a method for detecting a microcrack using the apparatus 10, which is configured as described above, for detecting a microcrack according to an embodiment of the present disclosure.

As shown in FIG. 12, the method for detecting a microcrack according to an embodiment of the present disclosure may schematically include: a measurement step S10 of performing a process of fixing a measurement target by using the fixing jig 22, applying a predetermined impact to the measurement target through the excitation means 23, and measuring acceleration responses through the respective acceleration sensors 24; a resonance point number identification step S20 of performing, through the analysis unit 12 of the apparatus 10, a process of calculating frequency response functions for the respective measurement points from the acceleration responses received from the respective acceleration sensors 24, and identifying the number of resonance points by acquiring resonance frequencies for the respective frequency response functions; an independence identification step S30 of performing, through the analysis unit 12, a process of acquiring, when a case of two resonance points is found, a modal assurance criterion (MAC) value for the resonance points, and identifying whether the resonance points are independent of each other, on the basis of a predetermined criterion; a modal analysis step S40 of performing, through the analysis unit 12, a process of analyzing whether principal planes of mode shape vectors of the respective resonance points are orthogonal to each other when it is determined that the resonance points are independent of each other, and identifying whether the resonance points have different modes; and a determination step S50 of performing, through the analysis unit 12, a process of determining that a crack exists at the measurement target when it is identified that the resonance points have different modes as a result of the analysis, and determining that the measurement target has a defect.

Herein, at the independence determination step S30, for example, the MAC value of 0.8 or greater is considered to indicate the same resonance point, and the MAC value of less than 0.8 is considered to indicate different modes.

In addition, the details of the above-described steps S10 to S50 may be configured as in the embodiment described with reference to FIGS. 1 to 7.

Accordingly, as described above, it is possible to realize an apparatus and a method for detecting a microcrack using orthogonality analysis of a mode shape vector and a principal plane in a resonance point according to an embodiment of the present disclosure. Considering the fact that when a microcrack exists, one resonance point appears as two sideband resonance points and that by performing comparison for a modal assurance criterion (MAC) value for two separate very close resonance points and by analyzing whether principal planes of two mode shape are orthogonal to each other, whether the modes are different is clearly identified, the apparatus and the method according to the present disclosure are configured to identify whether two resonance points are independent of each other through the MAC value when a resonance point of a frequency response function acquired in microcrack inspection is divided into two sidebands, and to analyze whether principal planes of mode shape information corresponding to the respective resonance points are orthogonal to each other, thereby determining whether a microcrack exists regardless of a measurement location more accurately compared to the conventional methods.

In addition, according to the present disclosure, provided is the apparatus and the method for detecting a microcrack using orthogonality analysis of a mode shape vector and a principal plane in a resonance point, the apparatus and the method being configured to be capable of always accurately determining whether a crack exists regardless of a measurement location as described above. Therefore, it is possible to solve the following problem of inspection apparatuses and methods in the related art: an inspection result having relatively high reliability is provided when an occurrence location of a defect, such as a crack, is close to a measurement point, but as a measurement location is far from an occurrence location of a defect, the sensitivity decreases and the accuracy of inspection is not guaranteed.

As described above, although the apparatus and the method for detecting a microcrack using orthogonality analysis of a mode shape vector and a principal plane in a resonance point according to the exemplary embodiments of the present disclosure have been described in detail, the present disclosure is not limited to the contents described above in the above embodiments. Therefore, various modifications, changes, combinations, and substitutions of the present disclosure may be allowed to be changed by those skilled in the art according to a design need and other various factors changed.

What is claimed is:

1. An apparatus for detecting a microcrack, the apparatus comprising:
   a measurement unit comprising multiple sensors and configured to measure whether a crack exists at a measurement target; and
   an analysis unit configured to determine whether a crack exists, on the basis of measurement values of the respective sensors of the measurement unit,
   wherein the measurement unit comprises:
      a fixing jig configured to fix the measurement target;
      excitation means configured to apply a predetermined impact to the measurement target; and
      multiple acceleration sensors attached at predetermined locations on the measurement target,
   the analysis unit further configured to:
      calculate frequency responses of the measurement target to the impact applied by the excitation means, on the basis of measurement values of the respective acceleration sensors,
      determine whether a crack exists by analyzing a number of resonance points and independence of the resonance points, on the basis of the fact that a resonance point of a frequency response function appears as two sideband resonance points when a crack exists at the measurement target,
      acquire, when a case of the two sideband resonance points is found, a modal assurance criterion (MAC) value for the resonance points, and identify whether the resonance points are independent of each other, on the basis of a predetermined criterion, and
      analyze whether principal planes of mode shape vectors of the respective resonance points are orthogonal to each other when it is determined that the resonance points are independent of each other as a result of identification, and identify whether the resonance points have different modes.

2. The apparatus of claim 1, further comprising:
   a communication unit configured to transmit and receive various types of data including the measurement values and analysis results by using at least one communication method of wireless communication or wired communication;
   a display unit comprising a display device configured to display a current state and operation of the apparatus, and the various types of data including the measurement values and the analysis results; and
   a controller configured to control an overall operation of the measurement unit, the analysis unit, the communication unit, and the display unit.

3. The apparatus of claim 2, wherein the apparatus is configured to store each processing process and the analysis results in a particular storage means according to control of the controller, to output through the display unit, and to transmit to an external device including a server or a user terminal, through the communication unit.

4. The apparatus of claim 3, wherein the user terminal is configured as an information communication terminal device on which a dedicated application program is installed, the device including a smartphone, a tablet PC, or a laptop computer, and being carried by an individual.

5. The apparatus of claim 1, wherein the fixing jig is configured to fix one end of the measurement target.

6. The apparatus of claim 1, wherein the excitation means is configured to include an impact hammer.

7. The apparatus of claim 1, wherein the acceleration sensors are configured such that at least one of the acceleration sensors is attached on each face of the measurement target.

8. The apparatus of claim 1, wherein the analysis unit is further configured to:
   calculate frequency response functions for respective measurement points from acceleration responses received from the respective acceleration sensors after the measurement target is fixed using the fixing jig and the predetermined impact is applied to the measurement target through the excitation means, and identify the number of the resonance points by acquiring resonance frequencies for the respective frequency response functions, and determine that a crack exists at the measurement target when it is identified that the resonance points have the different modes as the result of identification, and determine that the measurement target has a defect.

9. The apparatus of claim 8, wherein the analysis unit is further configured to perform a process in which the modal assurance criterion (MAC) value of 0.8 or greater is considered to indicate the same resonance point, and the modal assurance criterion (MAC) value of less than 0.8 is considered to indicate the different modes.

10. A method for detecting a microcrack using an apparatus for detecting a microcrack, the method comprising:

performing a process of fixing a measurement target by using a fixing jig of the apparatus, applying a predetermined impact to the measurement target through excitation means of the apparatus, and measuring acceleration responses through respective acceleration sensors of the apparatus;

performing, through an analysis unit of the apparatus, a process of calculating frequency response functions for respective measurement points from the acceleration responses received from the respective acceleration sensors, and identifying a number of resonance points by acquiring resonance frequencies for the respective frequency response functions;

performing, through the analysis unit of the apparatus, a process of acquiring, when a case of two resonance points is found, a modal assurance criterion (MAC) value for the resonance points, and identifying whether the resonance points are independent of each other, on the basis of a predetermined criterion;

performing, through the analysis unit of the apparatus, a process of analyzing whether principal planes of mode shape vectors of the respective resonance points are orthogonal to each other when it is determined that the resonance points are independent of each other, and identifying whether the resonance points have different modes; and performing, through the analysis unit of the apparatus, a process of determining that a crack exists at the measurement target when it is identified that the resonance points have the different modes, and determining that the measurement target has a defect.

11. The method of claim 10, further comprising performing a process in which the modal assurance criterion (MAC) value of 0.8 or greater is considered to indicate the same resonance point, and the modal assurance criterion (MAC) value of less than 0.8 is considered to indicate the different modes.

* * * * *